US008822069B2

(12) United States Patent
Baek et al.

(10) Patent No.: US 8,822,069 B2
(45) Date of Patent: Sep. 2, 2014

(54) BATTERY PACK

(75) Inventors: Woon-Seong Baek, Yongin-si (KR);
Young-Ho Kim, Yongin-si (KR);
Kyung-Won Seo, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 744 days.

(21) Appl. No.: 12/969,925

(22) Filed: Dec. 16, 2010

(65) Prior Publication Data
US 2011/0281141 A1 Nov. 17, 2011

(30) Foreign Application Priority Data
May 13, 2010 (KR) .................. 10-2010-0045046

(51) Int. Cl.
*H01M 2/04* (2006.01)
*H01M 2/22* (2006.01)
*H01M 2/34* (2006.01)

(52) U.S. Cl.
USPC .................. 429/175; 429/7; 429/62

(58) Field of Classification Search
None
See application file for complete search history.

(56) References Cited

U.S. PATENT DOCUMENTS

| 5,229,566 | A | 7/1993 | Alexandres |
| 5,238,757 | A | 8/1993 | Suzuki et al. |
| 6,175,624 | B1 | 1/2001 | Brundieck et al. |
| 6,562,493 | B2 | 5/2003 | Tsukada et al. |
| 7,732,091 | B2 | 6/2010 | Jung |
| 2007/0090167 | A1 | 4/2007 | Arjakine et al. |
| 2007/0188132 | A1 | 8/2007 | Kim et al. |
| 2008/0063932 | A1 | 3/2008 | Ishizu et al. |
| 2009/0123834 | A1 | 5/2009 | Byun |
| 2009/0155632 | A1 | 6/2009 | Byun et al. |
| 2009/0186268 | A1* | 7/2009 | Song .................... 429/163 |
| 2010/0055560 | A1* | 3/2010 | Jang et al. ............. 429/163 |
| 2010/0159287 | A1 | 6/2010 | Kwag et al. |

FOREIGN PATENT DOCUMENTS

| KR | 1020050123367 A | 12/2005 |
| KR | 1020080013212 A | 2/2008 |
| KR | 1020090051590 A | 5/2009 |
| KR | 1020090062539 A | 6/2009 |
| KR | 1020090064069 A | 6/2009 |

OTHER PUBLICATIONS

Machine translation of KR 10-2009-0062539, Jun. 2009.*
Korean Office Action issued by Korean Patent Office on Jul. 18, 2011, corresponding to Korean Patent Application No. 10-2010-0045046 and Request for Entry of the Accompanying Office Action.

* cited by examiner

*Primary Examiner* — Jonathan Crepeau
(74) *Attorney, Agent, or Firm* — Robert E. Bushnell, Esq.

(57) ABSTRACT

A battery pack includes a bare cell including an electrode assembly arranged within a can having an opening that is sealed by a cap plate, a protective circuit module (PCM) arranged on the cap plate, a lead member connecting the PCM to the cap plate; a coupling member inserted into the cap plate and coupled to the lead member. The coupling member is made out of a different material than that of the cap plate, each of the coupling member and the lead member include nickel. By including such a coupling member, the strength and durability of the weld connecting the cap plate to the PCM is improved and the contact resistance is lowered.

18 Claims, 8 Drawing Sheets

BATTERY PACK

CLAIM OF PRIORITY

This application claims the benefit of Korean Patent Application No. 10-2010-0045046, filed on May 13, 2010, in the Korean Intellectual Property Office, the disclosure of which is incorporated herein in its entirety by reference.

BACKGROUND OF THE INVENTION

1. Field of the Invention

A battery pack in which a battery cell and a circuit configuration are combined with each other.

2. Description of the Related Art

There is an increasing demand for using a secondary battery as an energy source according to technological development and an increase in the manufacture thereof with respect to mobile devices such as mobile phones, notebook computers, and the like. Recently, as a substitute energy source for replacing fossil fuel, secondary batteries are also being studied and developed for use in electric vehicles and hybrid vehicles.

In general, a secondary battery is arranged in a battery pack that is integrally formed with a circuit configuration that controls charging and discharging operations. Since the secondary battery includes a flammable material, in consideration of stability of the secondary battery, the battery pack has a circuit configuration that efficiently controls abnormal operation states such as overcharging, overdischarging, overcurrent, and the like.

SUMMARY OF THE INVENTION

One or more embodiments of the present invention include a battery pack having an improved combination structure of a battery cell and a protective circuit.

According to one aspect of the present invention, there is provided a battery pack that includes a bare cell including an electrode assembly arranged within a can having an opening that is sealed by a cap plate, a protective circuit module (PCM) arranged on the cap plate, a lead member connecting the PCM to the cap plate and a coupling member inserted into the cap plate and coupled to the lead member.

The coupling member and the lead member may be coupled to each other by a weld. The coupling member may include a different material than that of the cap plate. Each of the lead member and the coupling member may include a first metal. The coupling member may include one of nickel and a nickel alloy. The coupling member may be interference-fit within an aperture within the cap plate. The coupling member may extend through the cap plate. The coupling member may be inserted into a first surface of the cap plate, and a portion of the coupling member may project from a second and opposite surface of the cap plate and may be coupled to the lead member. When the coupling member is inserted into the cap plate, an end of the coupling member may be arranged within a thickness of the cap plate.

The coupling member may be inserted into a first surface of the cap plate, and a portion of the coupling member may project from the first surface of the cap plate and be coupled to the lead member. The coupling member may not project from a second and opposite surface of the cap plate. The lead member may include a projecting portion that bulges toward and is coupled to the coupling member. At least a portion of the coupling member may have a tapered-shape along a thickness direction of the cap plate.

The coupling member may include a first portion coupled to the lead member and a second portion extending from the first portion while being stepped from the first portion, the second portion forming a projecting part with respect to the cap plate. The coupling member may include a first portion coupled to the lead member and forming a projecting part with respect to the cap plate and a second portion extending from the first portion while being stepped from the first portion, the second portion having a smaller width than the first portion and being arranged within the cap plate. A coupling aperture may be arranged within the lead member to correspond to the coupling member, a portion of the coupling member may be arranged within the coupling aperture of the lead member.

According to another aspect of the present invention, there is provided a battery pack that includes a bare cell sealed by a cap plate, a protective circuit module (PCM) arranged on the cap plate, a lead member comprising a first portion coupled to the PCM and a second portion extending from the first portion and set on the cap plate and a coupling member extending through a thickness direction of the cap plate and being coupled to the lead member by a weld, the coupling member being comprised of a different material than that of the cap plate. Each of the lead member and the coupling member may include a first metal. The coupling member may include one of nickel and a nickel alloy.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Reference will now be made in detail to embodiments, examples of which are illustrated in the accompanying drawings. As used herein, the term "and/or" includes any and all combinations of one or more of the associated listed items.

Figure 1:
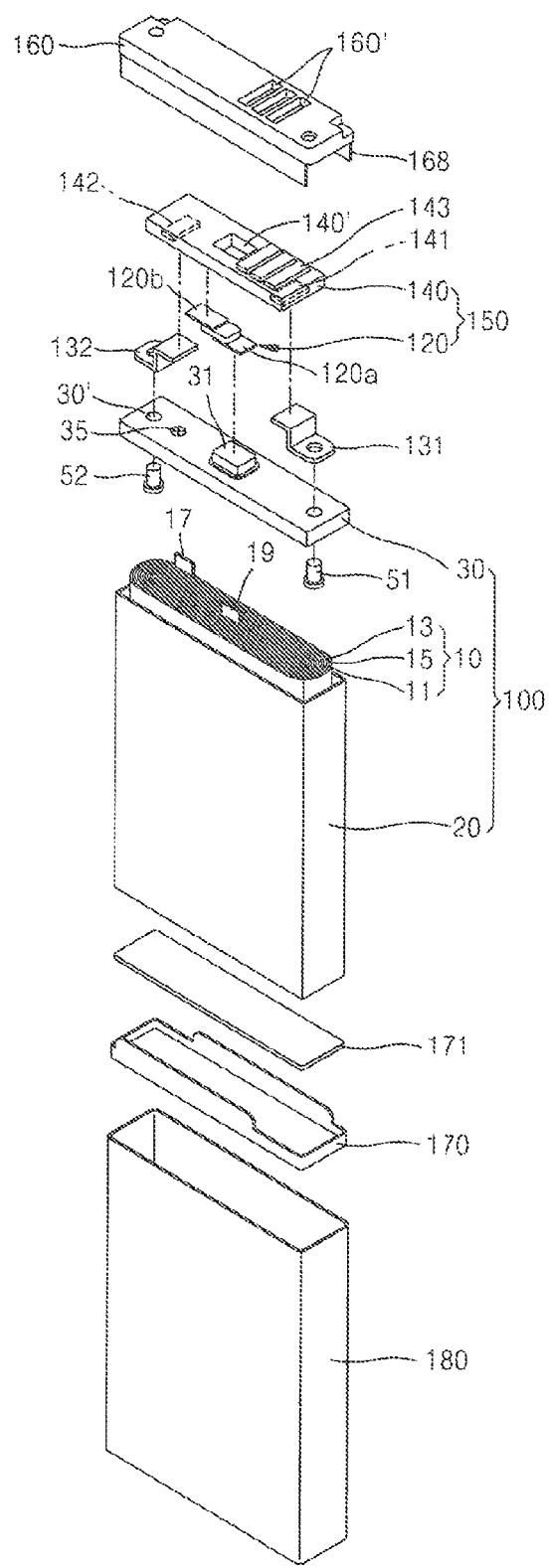
FIG. 1 is an exploded perspective view of a battery pack according to a first embodiment of the present invention.
Figure 2:
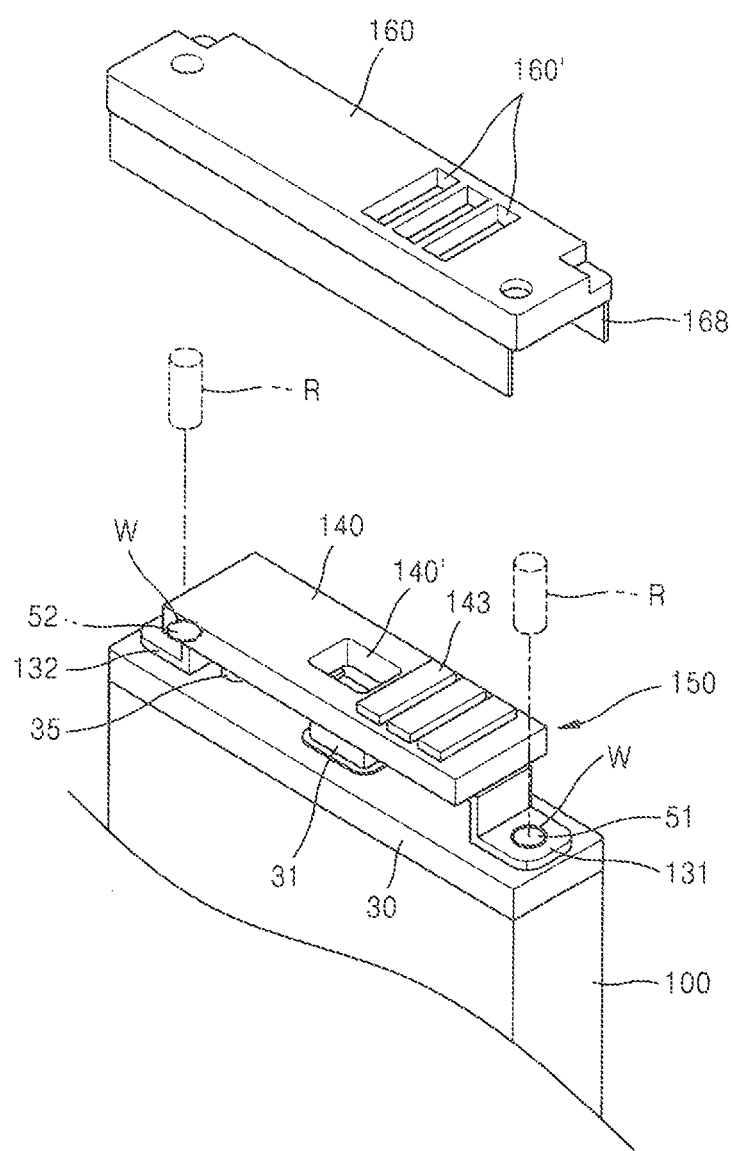
FIG. 2 is a diagram of the battery pack of FIG. 1 having a protective circuit module mounted thereon.

Turning now to FIGS. 1 and 2, FIG. 1 is an exploded perspective view of a battery pack according to a first embodiment of the present invention and FIG. 2 is a diagram of the battery pack of FIG. 1 having a protective circuit module mounted thereon. The battery pack includes a bare cell 100 having a power generating element, a protective circuit module (PCM) 150 mounted on the bare cell 100 to control charging and discharging operations of the bare cell 100, and an upper cover 160 coupled to the bare cell 100 to receive the PCM 150.

The bare cell 100 is a rechargeable secondary battery that may be a lithium-ion battery, and has a structure in which an electrode assembly 10 that includes a positive electrode plate 11, a negative electrode plate 13, and a separator 15 is submerged in an electrolyte (not shown) and then sealed within a can 20. For example, the bare cell 100 may include the electrode assembly 10 in the shape of a jelly roll produced by rolling the positive electrode plate 11, the negative electrode plate 13, and the separator 15; the can 20 having an opening at its top surface to receive the electrode assembly 10 and the electrolyte; and a cap plate 30 to seal the opening of the can 20. After the electrode assembly 10 is inserted into the can 20, the opening of the can 20 is closed by the cap plate 30. A contact between the cap plate 30 and the can 20 may be laser-welded to form a sealed combination.

For example, a positive electrode tab 17 of the electrode assembly 10 is connected to the cap plate 30, and a negative electrode tab 19 is connected to an electrode terminal 31 that upwardly projects from the cap plate 30. The electrode terminal 31 is coupled to but insulated from the cap plate 30, and projects upward from the cap plate 30 to electrically connect the bare cell 100 to the PCM 150.

A safety vent 35 is located at one side of the cap plate 30, and when broken provides a gas exhaustion path when an inner pressure of the can 20 exceeds a threshold value. Meanwhile, an insulating label sheet 180 having an adhesive coated thereon is adhered to an outer surface of the bare cell 100. An adhering member 171 such as a double-sided adhesive tape is arranged at a bottom of the bare cell 100 so that a lower cover 170 may be coupled thereto.

The PCM 150 functions to control the charging and discharging operations of the bare cell 100, and to perform a protective operation to protect an operation of the bare cell 100. The PCM 150 may include a protective circuit substrate 140 and a positive temperature coefficient (PTC) protecting device 120.

The protective circuit substrate 140 and the PTC protecting device 120 are protecting units that prevent an overcharge, an overcurrent, an overdischarge, and the like of the bare cell 100. The PTC protecting device 120 forms a charge-discharge current path between the protective circuit substrate 140 and the bare cell 100, and forcibly decreases a current when a charge-discharge current deviates from a set point.

The protective circuit substrate 140 may be a printed circuit board (PCB) that includes a wire pattern to form a charge-discharge current path between an external device and the bare cell 100, and includes a protective circuit to restrict a charge-discharge current of the bare cell 100. For example, an external connection terminal 143 for electrical connection to an external device is arranged on one surface of the protective circuit substrate 140, and first and second pads 141 and 142 for electrical connection to the bare cell 100 are arranged on another surface of the protective circuit substrate 140. The external connection terminal 143 directly contacts an external device, thereby functioning to input a charge current to the bare cell 100 or to output a discharge current from the bare cell 100.

First and second lead members 131 and 132 are interposed between the PCM 150 and the cap plate 30 to structurally fix the PCM 150 to the cap plate 30, and at least one of the first and second lead members 131 and 132 may also function to provide an electrical connection between the cap plate 30 and the PCM 150. For example, the first and second lead members 131 and 132 can be arranged on top sides of the cap plate 30. The first and second lead members 131 and 132 may be bent twice to have top and bottom surfaces that are stepped with respect to each other. The top surfaces thereof are connected to the first and second pads 141 and 142 while the bottom surfaces thereof are connected to the cap plate 30. The first and second lead members 131 and 132 may be produced by processing a nickel thin plate into a particular shape.

The first and second lead members 131 and 132 may be welded to both the PCM 150 and the cap plate 30. For example, the first and second lead members 131 and 132 may be arranged as one body with the PCM 150 by being fixed to the first and second pads 141 and 142, which are formed on a bottom surface of the protective circuit substrate 140, via a welding or soldering operation. After that, the first and second lead members 131 and 132 exposed from ends of the PCM 150 may be welded on the cap plate 30. Here, in order to weld the first and second lead members 131 and 132 onto the cap plate 30, one of several various well known welding techniques may be employed. For example, a laser welding technique or an electric resistance welding technique may be employed. As illustrated in FIG. 2, welding areas W may be formed on the first and second lead members 131 and 132 arranged on the top surface of the cap plate 30. A reference mark R in FIG. 2 indicates a welding tool such as a laser welding tool or a rod-shaped electrode for welding.

The PTC protecting device 120 may have one lead 120a connected to the electrode terminal 31 of the cap plate 30, and another lead 120b connected to the protective circuit substrate 140. The lead 120a of the PTC protecting device 120 may be welded and fixed on the electrode terminal 31 of the cap plate 30. For example, a welding aperture 140' may be formed at a center portion of the protective circuit substrate 140, and a welding tool (not shown), e.g., a rod-shaped electrode for welding, may be inserted via the welding aperture 140' to perform spot welding, which is a type of a resistance welding technique that may be performed between the lead 120a of the PTC protecting device 120 and the electrode terminal 31. The welding aperture 140' is formed to allow the PTC protecting device 120 and the electrode terminal 31 to be directly welded from above by providing a path for receiving the welding tool.

The PTC protecting device 120 forms a charge-discharge current path between the electrode terminal 31 of the cap plate 30 and the protective circuit substrate 140, and forcibly decreases a current when a charge-discharge current deviates (i.e., exceeds) from a set point.

Coupling members 51 and 52 provide a contact point for the first and second lead members 131 and 132, are inserted into the cap plate 30. The coupling members 51 and 52 may be made out of a material having different characteristics than that of the cap plate 30, and may be fixed onto the cap plate 30, thereby forming the contact point for the first and second lead members 131 and 132. For example, in order to form a firm welding point for the first and second lead members 131 and 132, the coupling members 51 and 52 may have a heat-resistant characteristic so as not to be easily deformed by welding heat, and may have a material characteristic that does not deteriorate or decrease upon being welded.

When the first and second lead members 131 and 132 are directly welded to the cap plate 30 made out of aluminum, due to the fact that aluminum is vulnerable to welding heat, the weld may deform upon external impact causing the first and second lead members 131 and 132 to deviate or become detached from their correct positions. As a result, the PCM 150 may deviate from its correct position so that the upper cover 160 fixed to the PCM 150 becomes detached, which may result in an assembly error. Also, a contact resistance between the first and second lead members 131 and 132 and the cap plate 30 is high, so that a resistance in the charge-discharge path is increased.

According to the first embodiment, by including coupling members 51 and 52 that are made out of a material having different characteristics than the cap plate 30, a bonding strength of the PCM 150 is increased and an electrical resistance in the charge-discharge path is decreased, and thus an electrical output characteristic of the battery pack is improved.

The coupling members 51 and 52 may be made out of a material that is highly resistant to deformation caused by welding but can be easily welded to the first and second lead members 131 and 132. For example, the coupling members 51 and 52 may be made out of nickel, that is, the same material as the first and second lead members 131 and 132, or can be made out of a metal material including a nickel as a component.

After the attachment of the PCM 150 to the cap plate 30 of the bare cell 100, the upper cover 160 is coupled the bare cell 100 to receive the PCM 150. An opening pattern 160' may be formed in the upper cover 160 to expose the external connection terminal 143 of the protective circuit substrate 140, and to allow access to an external device. A double-sided adhesive tape (not shown) may be interposed between the upper cover 160 and the PCM 150, thereby coupling the upper cover 160 to the PCM 150.

In a final stage of the manufacture of the battery pack, the insulating label sheet 180 having the adhesive coated therein surrounds the outer surface of the bare cell 100. Here, the insulating label sheet 180 is also adhered to sleeves 168 of the upper cover 160 together with the bare cell 100, and by doing so, the upper cover 160 and an external surface of the bare cell 100 may be tightly adhered.

Figure 3:
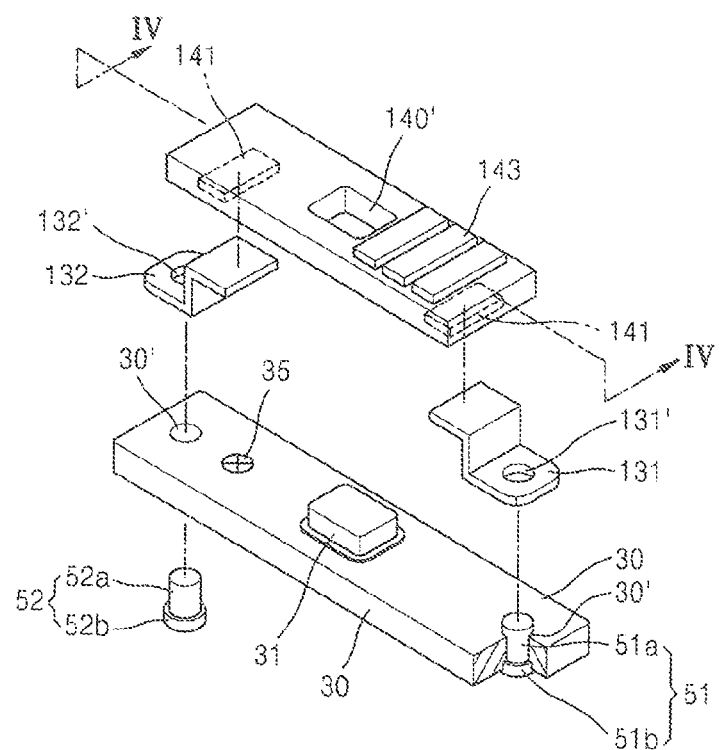
FIG. 3 is a diagram of an assembly of a cap plate and coupling members according to the first embodiment of the present invention.
Figure 4:
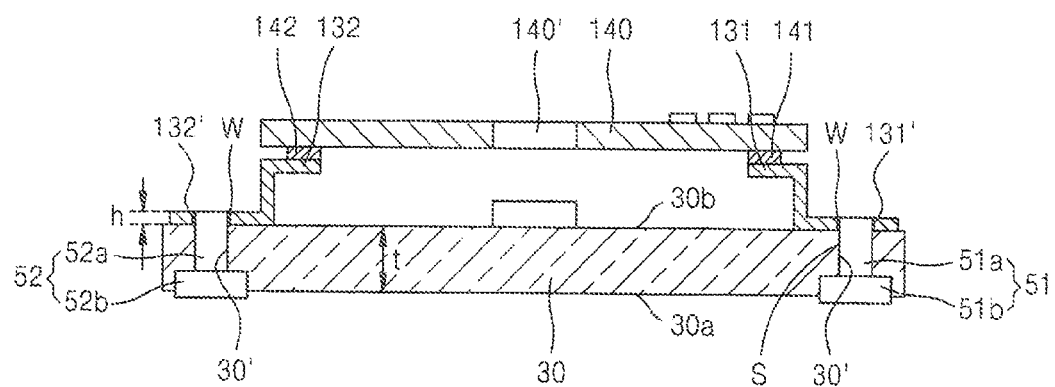
FIG. 4 is a cross-sectional view of the assembly of FIG. 3, taken along a line IV-IV.

Turning now to FIGS. 3 and 4, FIG. 3 is a diagram of an assembly of the cap plate 30 and the coupling members 51 and 52 and FIG. 4 is a cross-sectional view of the assembly of FIG. 3, taken along a line IV-IV according to the first embodiment of the present invention. Here, the coupling members 51 and 52 are inserted into the cap plate 30 and upwardly penetrate into the cap plate 30. Cap plate 30 is perforated by assembly apertures 30' to allow for insertion of the coupling members 51 and 52 therein. Specifically, a pair of assembly apertures 30' may be formed, one at each end of the cap plate 30 to correspond to coupling locations of the first and second lead members 131 and 132, respectively.

The coupling members 51 and 52 may be interference-fit within the cap plate 30. By doing so, a gap between the walls of the assembly apertures 30' of the cap plate 30 and the coupling members 51 and 52 can be prevented so that it is possible to efficiently prevent leakage of an electrolyte.

For example, the coupling members 51 and 52 are inserted from a first surface (a bottom surface 30a) of the cap plate 30, portions of the coupling members 51 and 52 protrude from a second surface (a top surface 30b) by penetrating a thickness t of the cap plate 30, and then the first and second lead members 131 and 132 are coupled to the exposed portions of the coupling members 51 and 52. In another example, the coupling members 51 and 52 may be inserted so that they are buried within the thickness t of the cap plate 30 instead of emerging from an opposite side of the cap plate 30. For example, the coupling members 51 and 52 may be inserted from the second surface (the top surface 30b) of the cap plate 30, and here, the coupling members 51 and 52 are inserted along a thickness direction of the cap plate 30 until the coupling members 51 and 52 reach a particular position while penetrating the first and second lead members 131 and 132. In this scenario, the coupling members 51 and 52 do not emerge from and protrude from the first surface (the bottom surface 30a).

The coupling members 51 and 52 may be pin-shaped, and may have a two-stage structure including first portions 51a and 52a that form a contact point with the first and second lead members 131 and 132 and are coupled to the first and second lead members 131 and 132, and second portions 51b and 52b that extend while being stepped from the first portions 51a and 52a and form projecting parts. The first portions 51a and 52a may have a relatively small diameter and may project from the cap plate 30 by a height h. In another example, top surfaces of the first portions 51a and 52a do not project from the top surface as the cap plate 30, or may have surfaces that are grooved with respect to the cap plate 30. In the latter case, the first and second lead members 131 and 132, which are opposite coupling parts, may have complimentary bulged surfaces as in FIG. 8 to contact the first portions 51a and 52a.

The second portions 51b and 52b have a relatively large diameter, project from an opposite side of the cap plate 30, and function as a stopper to prevent the coupling members 51 and 52 from slipping out of the assembly apertures 30'. The assembly apertures 30' may have a step-shaped cross-section having small and large diameter portions as in FIGS. 5, 6 and 8 to tightly fit to the two-stage structure of the coupling members 51 and 52. This two-stage design is because foreign materials from an outside or an electrolyte on the inside may intrude or may be leaked via interfaces between the coupling members 51 and 52 and the sidewalls of the assembly apertures 30'. By forming stepped interfaces S as in FIG. 4 between the coupling members 51 and 52 and the assembly apertures 30', it is possible to efficiently prevent intrusion of foreign materials and leakage of an electrolyte.

For example, the coupling members 51 and 52 may be inserted into the cap plate 30 from the bottom side 30a of the cap plate 30 in a manner that the first portions 51a and 52a are an upper portion and the second portions 51b and 52b are a lower portion. Also, the first and second lead members 131 and 132 are arranged at positions that correspond to the coupling members 51 and 52 of the cap plate 30. Here, coupling apertures 131' and 132' may be formed in the first and second lead members 131 and 132, and the first and second lead members 131 and 132 may be fixed to the coupling members 51 and 52 by being inserted onto the coupling members 51 and 52 via the coupling apertures 131' and 132'. A welding operation may be performed along boundaries between the first and second lead members 131 and 132 and the coupling members 51 and 52, which are temporarily coupled, and thus an arc-shaped or circular-shaped weld W may be formed thereon. For example, laser welding may be performed between the first and second lead members 131 and 132 and the coupling members 51 and 52.

Figure 5:
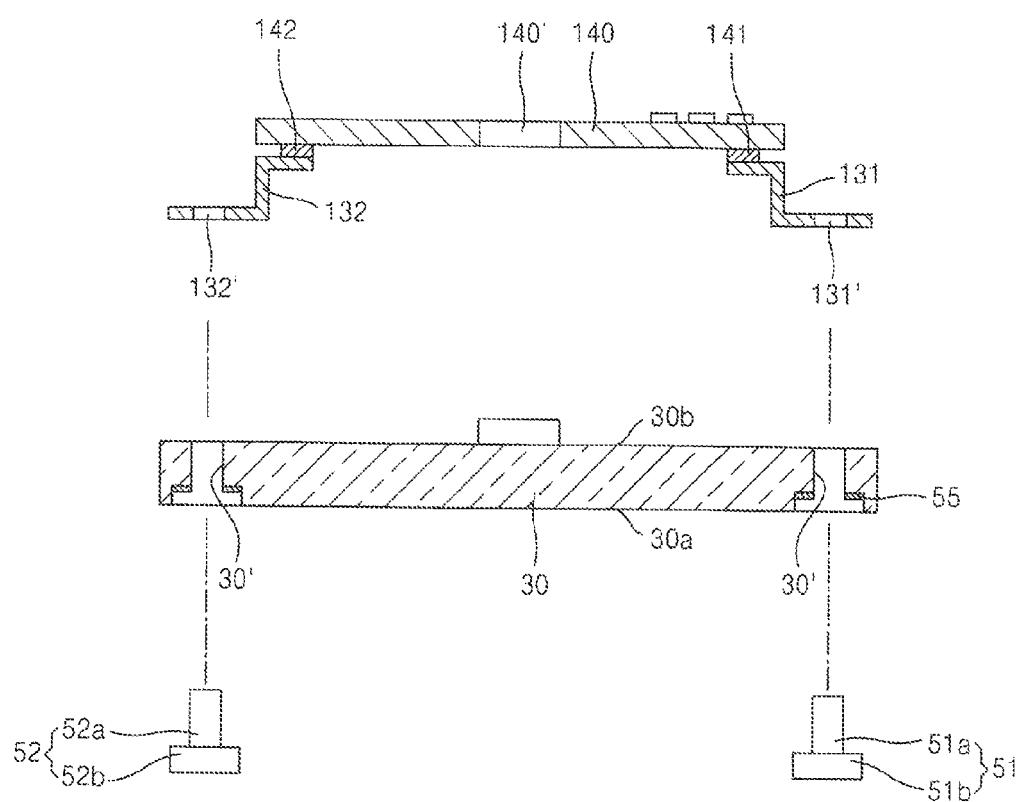
FIGS. 5 and 6 are first and second variations of the first embodiment of the present invention where a annular-shaped gasket and a sleeve-shaped gasket are further included.
Figure 6:
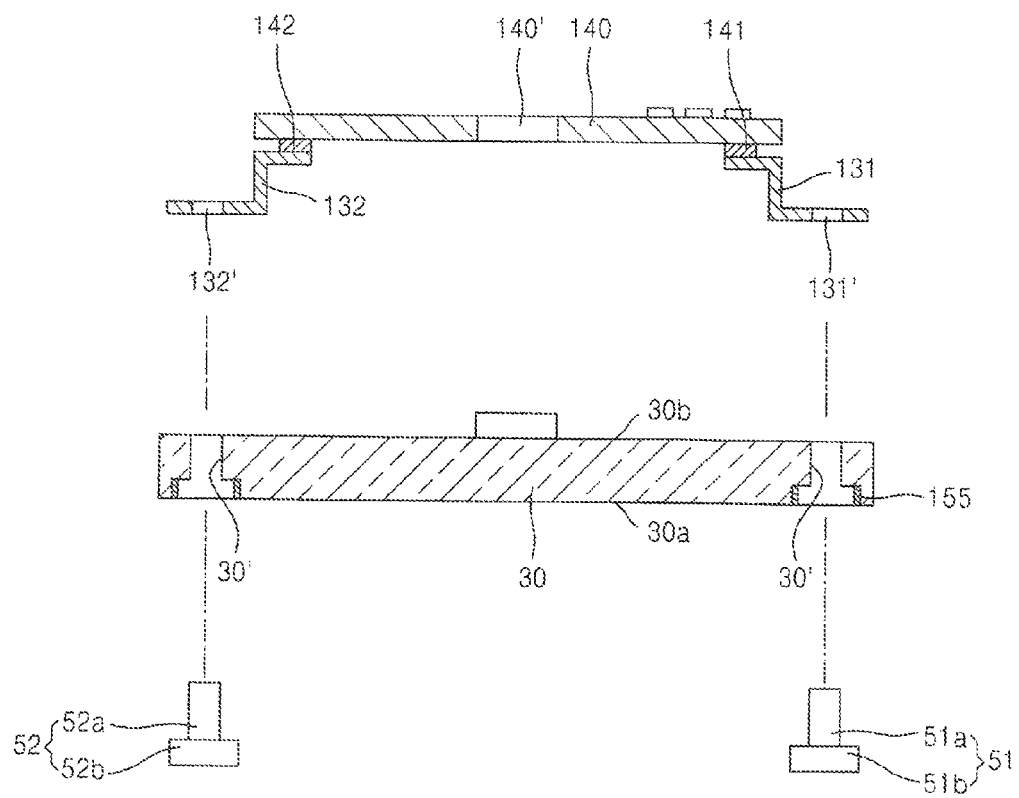

Turning now to FIGS. 5 and 6, FIGS. 5 and 6 pertain to first and second variations of the first embodiment of the present invention where a gasket is further included within the assembly apertures 30' to better form a seal between the coupling members 51/52 and the side walls of the assembly apertures 30'. Referring now to FIG. 5, a gasket 55 may further be inserted into each assembly aperture 30' to seal an inner surface between the coupling members 51 and 52 and the cap plate 30. Referring to FIG. 5, a gasket 55 having an annular ring-shape is arranged on stepped parts of the assembly apertures 30', the coupling members 51 and 52 are assembled therein in such a manner that the coupling members 51 and 52 penetrate both the cap plate 30 and the gasket 55.

Although FIG. 5 shows gasket 55 having a shape of an annular ring, the present invention is in no way so limited thereto. For example, as illustrated in FIG. 6, a gasket 155 may instead have a sleeve-shaped ring that extends in a longitudinal direction of the coupling members 51 and 52 and the assembly apertures 30' to surround side surfaces of the coupling members 51 and 52, and the coupling members 51 and 52 may be interference-fit in the assembly apertures 30' by interposing the gasket 155 therebetween.

Figure 7:
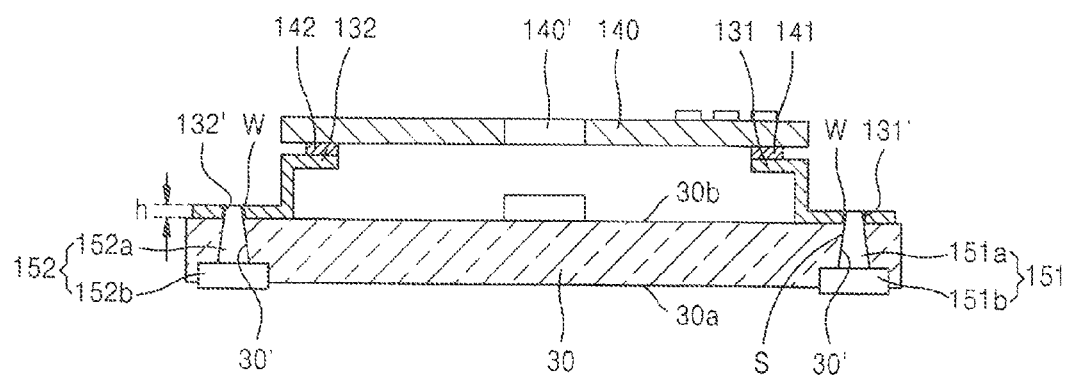
FIG. 7 is a diagram of an assembly of a cap plate and coupling members according to a second embodiment of the present invention.

Turning now to FIG. 7, FIG. 7 is a diagram of an assembly of the cap plate 30 and coupling members 151 and 152 according to a second embodiment of the present invention. Referring to FIG. 7, the coupling members 151 and 152 are inserted from a bottom side 30a of the cap plate 30 and are coupled to ends of the cap plate 30 by an interference-fit.

The coupling members 151 and 152 include first portions 151a and 152a that are coupled to the first and second lead members 131 and 132 via portions of the coupling members 151 and 152 that protrude from a top side 30b of the cap plate 30, and second portions 151b and 152b that extend while being stepped from the first portions 151a and 152a and form projecting parts with respect to the bottom side 30a of the cap plate 30.

For example, the first portions 151a and 152a may project from a top side 30b of the cap plate 30 by a height h. In another example, top surfaces of the first portions 151a and 152a may not project from the cap plate 30, or may have surfaces that are grooved with respect to the cap plate 30. In the latter case, the first and second lead members 131 and 132, which are opposite coupling parts, may have complementary bulged surfaces as in FIG. 8 to contact the first portions 151a and 152a.

As illustrated in FIG. 7, the first portions 151a and 152a may have a tapered-shape in which upper portions of the first portions 151a and 152a are relatively narrow while lower portions of the first portions 151a and 152a are relatively wide. By having first portions 151a and 152a that are tapered, a contact area with inner walls of the assembly apertures 30' may be increased and thus leakage of an electrolyte may be efficiently prevented by a tight contact between the first portions 151a and 152a and sidewalls of the assembly apertures 30'. The second portions 151b and 152b extend while being stepped from the first portions 151a and 152a and may function as a stopper to prevent the coupling members 151 and 152 from moving in a vertical direction from their correct positions within the cap plate 30, and may form boundaries that are stepped from the assembly apertures 30' to prevent intrusion of foreign materials and leakage of an electrolyte. Sidewalls of the assembly apertures 30' are formed to couple with the tapered coupling members 151 and 152. In a similar manner as in FIGS. 5 and 6, a gasket may also be arranged within the assembly apertures 30'.

The first and second lead members 131 and 132 may be arranged at locations that correspond to the coupling members 151 and 152 of the cap plate 30, and the sidewalls of the coupling apertures 131' and 132' may mate with sides of the coupling members 151 and 152. A welding operation may be performed along boundaries between the first and second lead members 131 and 132 and the coupling members 151 and 152, by for example, a laser welding technique. The first and second lead members 131 and 132 may be coupled on the cap plate 30 via an arc-shaped or circular-shaped weld W, and the first and second lead members 131 and 132 and the cap plate 30 may be electrically connected to each other via conductive coupling therebetween. For example, the coupling members 151 and 152 may be made out of the same type of metal in consideration of weldability to that of the first and second lead members 131 and 132. In more detail, the coupling members 151 and 152 may be made out of nickel metal or a nickel alloy.

Figure 8:
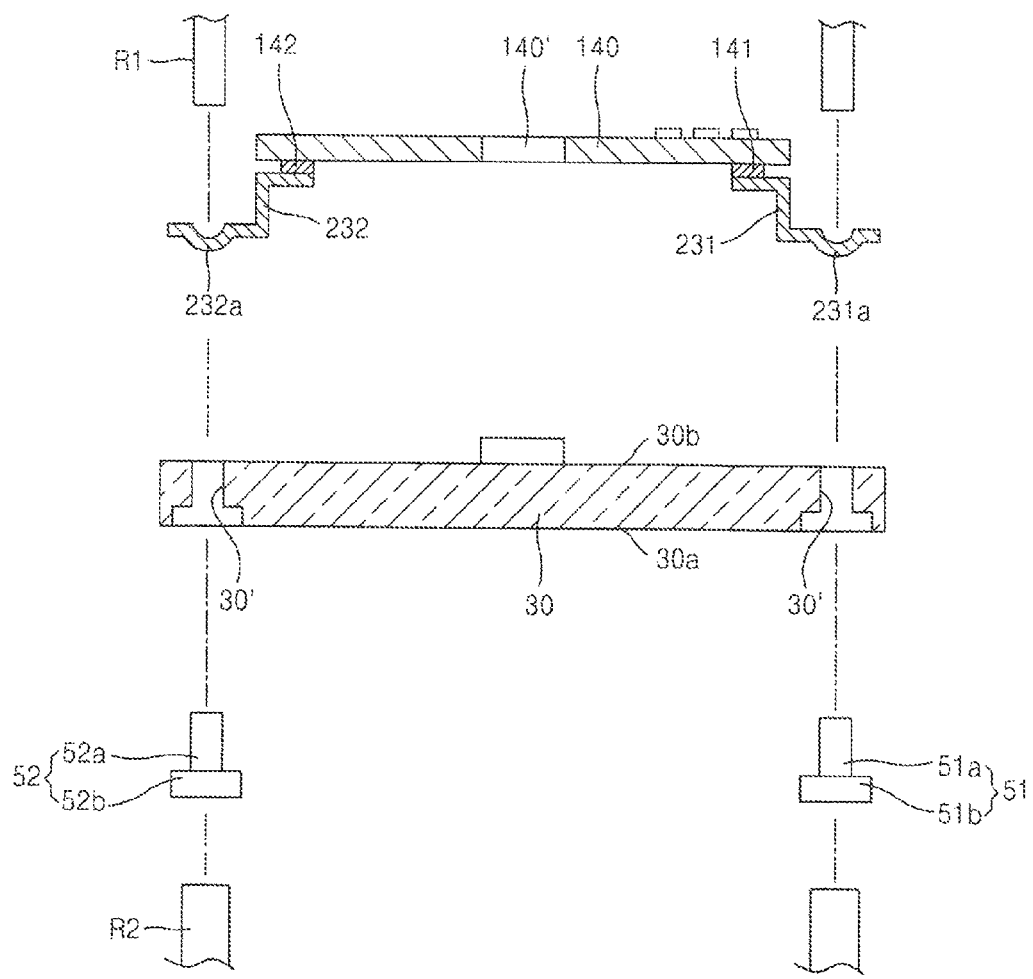
FIG. 8 is a diagram of a coupling structure of lead members according to a third embodiment of the present invention.

Turning now to FIG. 8, FIG. 8 is a diagram of a coupling structure of lead members 231 and 232 according to a third embodiment of the present invention. Referring to FIG. 8, the lead members 231 and 232 extend from portions thereof connected to the protective circuit substrate 140 and are set on the cap plate 30 and are welded with respect to the coupling members 51 and 52. For example, the top surfaces of the coupling members 51 and 52 may not project from the cap plate 30 but may instead be flush with a top surface 30b of the cap plate 30 or may not even teach the top surface 30b of the cap plate 30.

Lead members 231 and 232 include projecting portions 231a and 232a that bulge toward the coupling members 51 and 52. By forming the projecting portions 231a and 232a on welding surfaces of the lead members 231 and 232 that contact the coupling members 51 and 52, it is possible to converge welding heat on the projecting portions 231a and 232a during a resistance welding process, thereby increasing the efficiency of the resistance welding technique.

When the lead members 231 and 232 and the coupling members 51 and 52 are coupled to each other by electric resistance welding, welding electrodes R1 and R2 having opposite polarities may be applied above and below the combination of the lead members 231 and 232 in contact with the coupling members 51 and 52. A welding current applied via the welding electrodes R1 and R2 partially melts the lead members 231 and 232 via joule heating while flowing through the small area that of the projecting portions 231a and 232a so that the projecting portions 231a and 232a may increase the efficiency of the resistance welding technique of welding the lead members 231 and 232 to the coupling members 51 and 52 respectively.

In the third embodiment, the projecting portions 231a and 232a may be produced by simultaneously bulging top and bottom surfaces of the lead members 231 and 232 via a press process where a total thickness of the lead members 231 and 232 is uniformly maintained. One possible variation to this is that the projecting portions 231a and 232a may be formed by varying a thickness of the lead members 231 and 232, and the projecting portions 231a and 232a may be produced in a manner that a profile of the bottom surfaces of the lead members 231 and 232 is varied with respect to the top surfaces.

Figure 9:
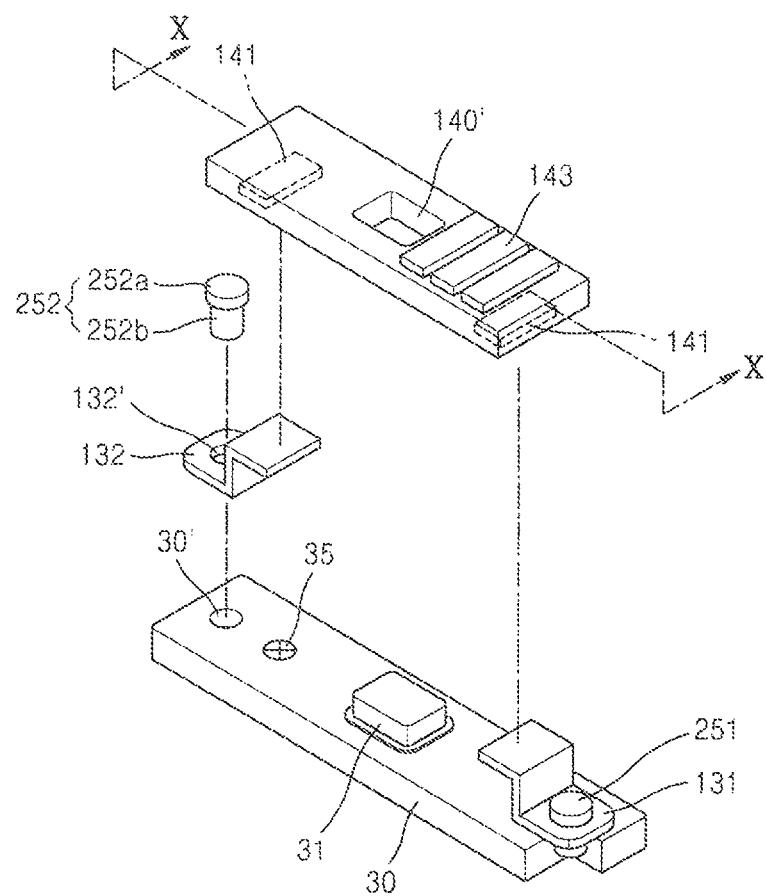
FIG. 9 is a diagram of an assembly of coupling members and a cap plate according to a fourth embodiment of the present invention.
Figure 10:
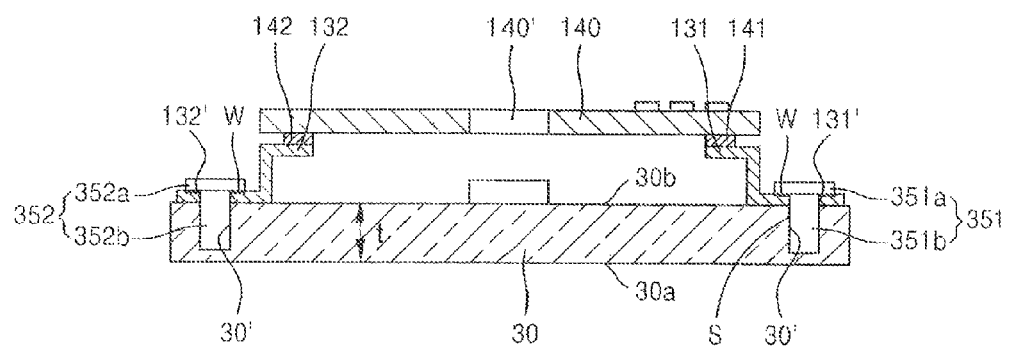
FIG. 10 is a cross-sectional view of the assembly of the coupling members and the cap plate of the fourth embodiment taken along line X-X of FIG. 9.

Turning now to FIGS. 9 and 10, FIG. 9 is a diagram of an assembly of coupling members 251 and 252, lead members 131 and 132 and the cap plate 30 according to a fourth embodiment of the present invention and FIG. 10 is a cross-sectional view of the arrangement of FIG. 9 taken along line X-X of FIG. 9. Referring to FIGS. 9 and 10, the coupling members 251 and 252 are inserted at both ends of the cap plate 30 on which the lead members 131 and 132 are arranged. Unlike the previous embodiments, the coupling members 251 and 252 are inserted from the second surface (the top surface 30b) of the cap plate 30, and end portions of the coupling members 251 and 252 are arranged within a thickness t of the cap plate 30 while extending through the lead members 131 and 132. That is, the coupling members 251 and 252 are buried within assembly apertures 30' of cap plate 30 and do not emerge and protrude from a bottom surface 30a of cap plate 30.

In this fourth embodiment of FIGS. 9 and 10, first portions 251a and 252a of the coupling members 251 and 252 are formed to have a larger diameter than the coupling apertures 131' and 132' of lead members 131 and 132, so that first portions 251a and 252a of coupling members 251 and 252 are stacked on top of the lead members 131 and 132 and cover the coupling apertures 131' and 132'. Second portions 251b and 252b that extend while being stepped from the first portions 251a and 252a are inserted through coupling apertures 131' and 132' of lead members 131 and 132 respectively and into the assembly apertures 30' of the cap plate 30. The first portions 251a and 252a of the coupling members 251 and 252, the lead members 131 and 132, and the cap plate 30 are stacked upon each other, and by performing welding on the first portions 251a and 252a of the coupling members 251 and 252, the stacked members may be integrated.

The welding may be performed upon the coupling members 251 and 252 being interference-fit with the lead members 131 and 132 and/or the cap plate 30, however the present invention is not limited thereto as the welding may instead be performed when the coupling members 251 and 252 are temporarily fixed by their own weight absent an interference fit.

Figure 11:
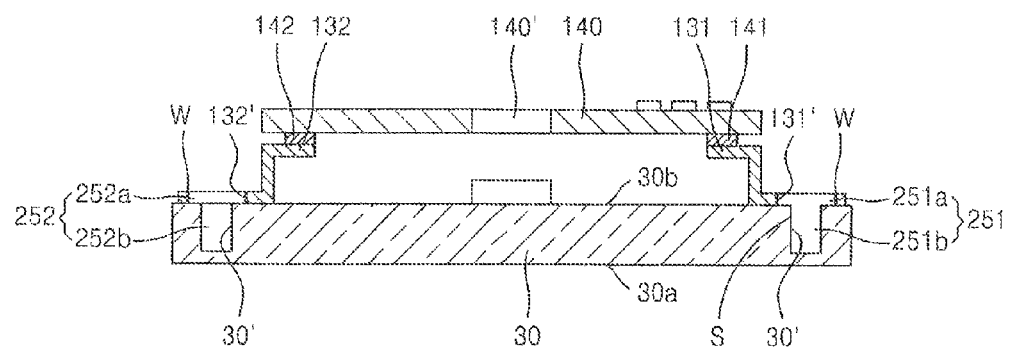
FIG. 11 is a cross-sectional view of an assembly of coupling members and a cap plate according to a fifth embodiment of the present invention.

Turning now to FIG. 11, FIG. 11 is a cross-sectional view of an assembly of coupling members 351 and 352 and cap plate 30 according to a fifth embodiment of the present invention. In the fifth embodiment of FIG. 11, first portions 351a and 352a of the coupling members 351 and 352 are formed to have a diameter of about a same size as that of coupling apertures 131' and 132' of lead members 131 and 132, so that first portions 351a and 352a of coupling members 351 and 352 can be inserted into and be arranged within coupling apertures 131' and 132' of lead members 131 and 132. Consequently, the first portions 351a and 352a may be supported by the cap plate 30 about the assembly apertures 30' and the second portions 351b and 352b are stepped and extend with respect to first portions 351a and 352a respectively and are arranged within assembly apertures 30' of cap plate 30.

For example, the coupling members 351 and 352 may be inserted from above the lead members 131 and 132, and may be interference-fit by penetrating the coupling apertures 131' and 132' of the lead members 131 and 132 and the assembly apertures 30' of the cap plate 30. Laser welding may be performed along boundaries between the lead members 131 and 132 and the coupling members 351 and 352, which are temporarily coupled together. Here, the lead members 131 and 132 and the cap plate 30, which both contact the coupling members 351 and 352, may all be welded together along an arc-shaped or circular-shaped weld W.

According to the embodiments of the present invention, in order to ensure a coupling strength of a protective circuit mounted on a battery cell case of a battery pack, coupling members made out of a different material from that of the battery cell case are inserted within a mounting area of the protective circuit. For example, the coupling members may have a heat-resistant characteristic so that the coupling members are not easily deformed by heat upon being welded, thereby providing a firm welding point for the protective circuit. The coupling members may have a material characteristic that does not deteriorate or decrease upon being welded, so that it is possible to increase the coupling strength of the bond between the protective circuit and the battery pack, and to prevent the protective circuit from deviating or slipping from a proper correct position. Also, since the electrical contact resistance in the charge-discharge path is decreased by including the coupling members due to a firm connection between the battery pack and the protective circuit, an electrical output characteristic of the battery pack is improved.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
    a bare cell including an electrode assembly arranged within a can having an opening that is sealed by a cap plate;
    a protective circuit module (PCM) arranged on the cap plate;
    a lead member connecting the PCM to the cap plate; and
    a coupling member inserted into and penetrating the cap plate and coupled to the cap plate and the lead member, wherein the coupling member extends through the cap plate.

2. The battery pack of claim 1, wherein the coupling member and the lead member are coupled to each other by a weld.

3. The battery pack of claim 1, wherein the coupling member comprises a different material than that of the cap plate.

4. The battery pack of claim 1, wherein each of the lead member and the coupling member comprise a first metal.

5. The battery pack of claim 4, wherein the coupling member comprises a material selected from a group consisting of nickel and a nickel alloy.

6. The battery pack of claim 1, wherein the coupling member is interference-fit within an aperture within the cap plate.

7. The battery pack of claim 1, wherein the coupling member is inserted into a first surface of the cap plate, and a portion of the coupling member projects from a second and opposite surface of the cap plate and is coupled to the lead member.

8. The battery pack of claim 1, wherein an end of the coupling member is coupled to the lead member.

9. The battery pack of claim 8, wherein the coupling member projects from a first surface of the cap plate and is coupled to the lead member.

10. The battery pack of claim 9, wherein opposite ends of the coupling member project from opposite major surfaces of the cap plate.

11. The battery pack of claim 1, wherein the lead member comprises a projecting portion that bulges toward and is coupled to the coupling member.

12. The battery pack of claim 1, wherein at least a portion of the coupling member has a tapered-shape along a thickness direction of the cap plate.

13. The battery pack of claim 1, wherein the coupling member comprises:
    a first portion coupled to the lead member; and
    a second portion extending from the first portion while being stepped from the first portion, the second portion forming a projecting part with respect to the cap plate.

14. The battery pack of claim 1, wherein the coupling member comprises:
    a first portion coupled to the lead member;
    a second portion extending from the first portion; and
    one of the first portion and the second portion comprising a projecting part with respect to the cap plate.

15. The battery pack of claim 1, wherein a coupling aperture is arranged within the lead member to correspond to the coupling member, a portion of the coupling member being arranged within the coupling aperture of the lead member.

16. A battery pack, comprising:
    a bare cell sealed by a cap plate;
    a protective circuit module (PCM) arranged on the cap plate;

a lead member comprising a first portion coupled to the PCM and a second portion extending from the first portion and set on the cap plate; and a coupling member extending through a thickness direction of the cap plate and penetrating the cap plate so as to be coupled to the cap plate and the lead member, the coupling member being coupled to the lead member by a weld, the coupling member being comprised of a different material than that of the cap plate.

17. The battery pack of claim 16, wherein each of the lead member and the coupling member is comprised of a first metal.

18. The battery pack of claim 17, wherein the coupling member is comprised of a material selected from a group consisting of nickel and a nickel alloy.

* * * * *